United States Patent
Pilipetskii et al.

(10) Patent No.: US 6,873,798 B1
(45) Date of Patent: Mar. 29, 2005

(54) METHOD AND APPARATUS FOR OPTIMIZING THE DISPERSION AND DISPERSION SLOPE FOR A DISPERSION MAP WITH SLOPE-COMPENSATING OPTICAL FIBERS

(75) Inventors: Alexei Pilipetskii, Colts Neck, NJ (US); Matthew Ma, Morganville, NJ (US); Morten Nissov, Ocean Township, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 654 days.

(21) Appl. No.: 09/706,475

(22) Filed: Nov. 3, 2000

(51) Int. Cl.$^7$ .......................... H04J 14/02; H04B 10/12
(52) U.S. Cl. ......................................... 398/81; 398/148
(58) Field of Search .................... 398/81, 148, 178; 385/123

(56) References Cited

U.S. PATENT DOCUMENTS

| | | | | |
|---|---|---|---|---|
| 6,084,993 A | * | 7/2000 | Mukasa | 385/24 |
| 6,324,317 B1 | * | 11/2001 | Tanaka et al. | 385/24 |
| 6,594,428 B1 | * | 7/2003 | Tanaka et al. | 385/123 |
| 6,606,437 B1 | * | 8/2003 | Mukasa et al. | 385/123 |
| 6,681,082 B1 | * | 1/2004 | Tanaka et al. | 398/158 |
| 2004/0028359 A1 | * | 2/2004 | Tirloni et al. | 385/123 |

FOREIGN PATENT DOCUMENTS

| | | | |
|---|---|---|---|
| EP | 1035671 | 9/2000 | H04B/10/18 |
| FR | 2790625 | 9/2000 | H04B/10/12 |

OTHER PUBLICATIONS

T. Li, "The Impact of Optical Amplifiers on Long–Distance Lightwave Telecommunications", Proceedings of the IEEE, vol. 81, No. 11, Nov. 1993.*

M. Murakami et al., "Long–Haul WDM Transmission Using Higher Order Fiber Dispersion Management", Journal of Lightwave Technology, IEEE. New York, US, vol. 18, No. 9, Sep. 2000, pp. 1197–1204.

T. Tsuritani et al., "Performance Comparison between SCD-CF–based System and RDF–based System in Slope–compensating Transoceanic WDM Transmission", Electronic Letters, IEE Stevenage, GB, vol. 36, No. 5, Mar. 2, 2000, pp. 447–448.

M. E. Marhic et al., "Optimizing the Location of Dispersion Compensators in Periodically Amplified Fiber Links in the Presence of Third–Order Nonlinear Effects", IEEE Photonics Technology Letters, IEEE Inc., New York, US, vol. 8, No. 1, 1996, pp. 145–147.

* cited by examiner

Primary Examiner—M. R. Sedighian
Assistant Examiner—Shi K. Li (57) ABSTRACT

An apparatus comprises an optical sublink including an operationally coupled optical fiber segments. The optical fiber segments are from a first optical fiber type, a second optical fiber type and a third optical fiber type. The first optical fiber type has a positive dispersion and a positive dispersion slope. The second optical fiber type has a negative dispersion and a negative dispersion slope. The third optical fiber type has one from the group of (1) a positive dispersion and a negative dispersion slope, and (2) a negative dispersion and a positive dispersion slope.

6 Claims, 6 Drawing Sheets

METHOD AND APPARATUS FOR OPTIMIZING THE DISPERSION AND DISPERSION SLOPE FOR A DISPERSION MAP WITH SLOPE-COMPENSATING OPTICAL FIBERS

BACKGROUND

The present invention generally relates to optical telecommunications. More specifically, the present invention relates to the optimization of optical fiber dispersion maps using slope-compensating optical fibers.

Light propagating within an optical fiber undergoes chromatic dispersion which causes the light to be delayed within the optical fiber. The specific amount of dispersion that light undergoes varies depending upon the wavelength of the light. The manner in which an optical fiber causes light to undergo chromatic dispersion is typically characterized by two parameters: (1) the dispersion at one specific wavelength, and (2) the dispersion slope. The dispersion slope indicates the extent to which dispersion varies as a function of wavelength.

The dispersion slope of an optical fiber can significantly limit the usable bandwidth for a wavelength-division multiplex (WDM) system, which uses multiple information channels each having their own wavelength of light. Each information channel can accumulate its own amount of dispersion of the transmission link length. For example, in a WDM system having 10 Gb/s data-rate information channels, the information channels can accumulate a large amount of dispersion (e.g., more than ∀ 3000 ps/nm) over long transmission distances, such as transoceanic transmission distances (e.g., 7000–10,000 km). When the accumulated dispersion is too large, the system performance is degraded due to intersymbol interference which in turn limits the system bandwidth.

Dispersion maps are known that attempt to compensate for accumulated dispersion, thereby expanding the usable bandwidth. For example, dispersion maps are known which use dispersion-compensating optical fibers. In one such example, optical fiber segments having dispersions with a similar magnitude, but opposite signs, can be alternatingly connected to define the optical link. In such a known dispersion map, the end-to-end path average dispersion remains low and fiber nonlinearities are suppressed.

Such a known dispersion map, however, suffers shortcomings. For example, the end-to-end path average dispersion varies significantly from wavelength to wavelength over long transmission distances due to the non-matching dispersion slopes of the two alternating optical fibers that define the overall optical link. Thus, a need exists to reduce the end-to-end path average dispersion below a tolerance threshold over a wide range of wavelengths. This need is particularly desirable with the prevalence of WDM systems and with the desire to increase the number of WDM channels.

SUMMARY OF THE INVENTION

An apparatus comprises an optical sublink including an operationally coupled optical fiber segments. The optical fiber segments are from a first optical fiber type, a second optical fiber type and a third optical fiber type. The first optical fiber type has a positive dispersion and a positive dispersion slope. The second optical fiber type has a negative dispersion and a negative dispersion slope. The third optical fiber type has one from the group of (1) a positive dispersion and a negative dispersion slope, and (2) a negative dispersion and a positive dispersion slope.

DETAILED DESCRIPTION

An apparatus comprises an optical sublink including a operationally coupled optical fiber segments. The optical fiber segments are from a first optical fiber type, a second optical fiber type and a third optical fiber type. The first optical fiber type has a positive dispersion and a positive dispersion slope. The second optical fiber type has a negative dispersion and a negative dispersion slope. The third optical fiber type has one from the group of (1) a positive dispersion and a negative dispersion slope, and (2) a negative dispersion and a positive dispersion slope.

The term "optical fiber segments" is used herein to include portions of optical fibers where each optical fiber portion has its own optical and/or physical characteristics, such as dispersion, dispersion slope, effective cross-sectional area and/or length. The optical fiber segments can be operationally coupled to define a longer "optical sublink"; multiple optical sublinks can be coupled together to define an optical link. For example, two types of optical fiber segments can be alternatingly coupled to define an optical sublink. The optical sublink can include optical devices (e.g., optical repeaters or branching units) or optical components (e.g., coupling devices such as lens) between two optical fiber segments. The optical sublink can be, for example, a portion of an optical communication system between the transmitter and the receiver.

The term "link spans" is used herein to include subsets of the optical link. For example, link spans can be portions of the optical link between two optical repeaters.

Figure 1:
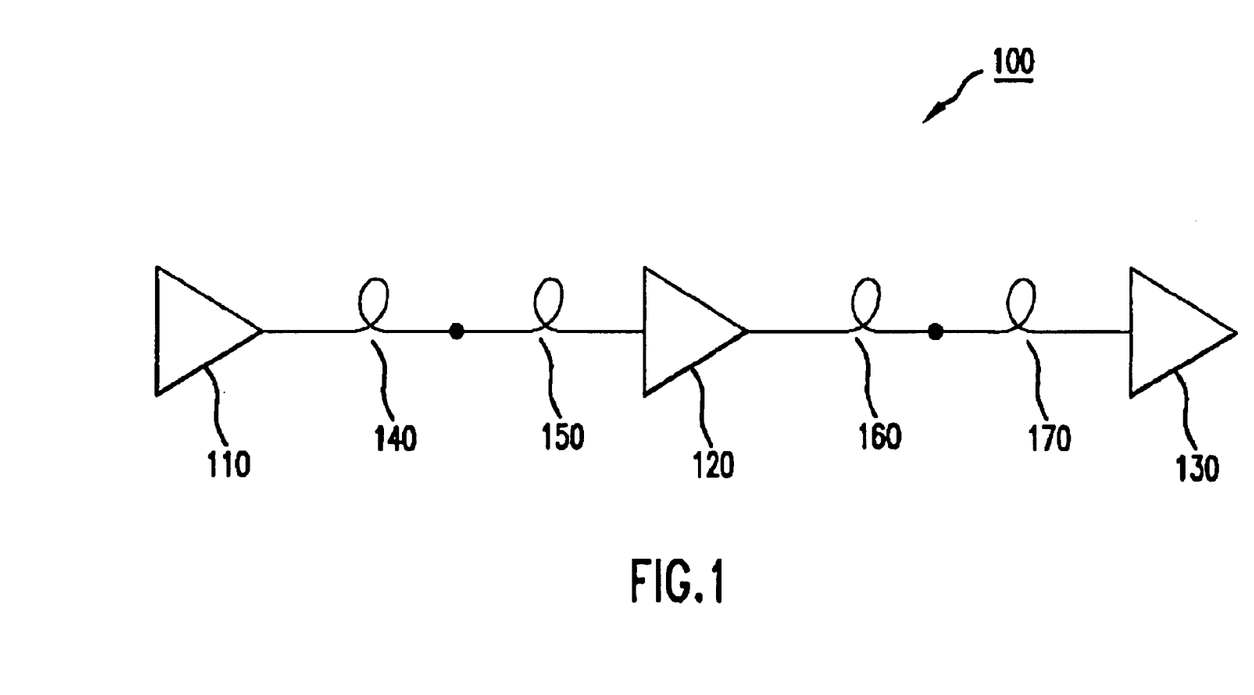
FIG. 1 illustrates an optical sublink configured of optical fibers having similar magnitude, but opposite signed, dispersions and dispersion slopes.

Optical fibers having opposite sign dispersions and opposite sign dispersion slopes are becoming commercially available. These optical fibers having appropriate lengths can be alternatingly coupled to form link spans of an optical sublink. FIG. 1 illustrates a portion of an optical link (i.e., an optical sublink) configured of optical fibers having opposite sign dispersion and opposite sign dispersion slope, in accordance with a one-level dispersion management (OLDM) scheme. In this particular example, the lengths of the optical fibers have similar lengths (although in other optical links, the optical fibers can have different lengths but similar relative dipsersion slopes, as discussed below). As shown in FIG. 1, fiber 100 includes amplifiers 10, 120, 130, and fiber segments 140, 150, 160 and 170. Fiber segments 140 and 160 can be of the same first type having a dispersion, a $D_1$, and having a length, $L_1$. Fiber segments 150 and 170 can be of the same second type having a dispersion, $D_2$, and having a length, $L_2$. In this example, a link span can be defined as fiber segments having the first and second fiber types (for example, fiber segments 140 and 150).

The first fiber type can have, for example, a dispersion, $D_1$, of 16.9 ps/nm-km; a dispersion slope, $D_1'$, of 0.06 ps/nm$^2$-km; and an effective area of 75 $\mu$m$^2$. Such a type of optical fiber is commercially available as "single-mode fiber (SMF)". The SMF fiber is produced by several fiber manufacturers including Corning and Lucent Technologies. The relative dispersion slope of the first fiber type equals the ratio of the first-fiber-type dispersion slope and dispersion, $D_1'/D_1$.

The second fiber type can have, for example, a dispersion, $D_2$, of $-17.0$ ps/nm-km; a dispersion slope, $D_2'$, of $-0.06$ ps/nm$^2$-km; and an effective area of 35 $\mu$m$^2$. Such a type of optical fiber has been designated commercially as "1x inverse-dispersion fiber (1x-IDF)". Another example of an optical fiber having a negative dispersion and a negative dispersion slope is the optical fiber designated commercially as "2x-IDF" which has a dispersion of $-34.0$ ps/nm-km and a dispersion slope of $-0.12$ ps/nm$^2$-km and an effective area of about 34 $\mu$m$^2$. Both the 1x-IDF and the 2x-IDF fibers are produced by Lucent Technologies. The relative dispersion slope of the second fiber type equals the ratio of the second-fiber-type dispersion slope and dispersion, $D_2'/D_2$.

By appropriately selecting the dispersion and dispersion slope of the first fiber type and of the second fiber type, the relative dispersion slope of the first and second fiber types can be approximately equal.

For such a configuration, the average dispersion, $D_{avg}$, can be determined by the following:

$$D_{avg} = \frac{D_1 L_1 + D_2 + L_2}{L_1 + L_2}$$

The average dispersion slope, $D'_{avg}$, can be determined by the following:

$$D'_{avg} = \frac{D_1' L_1 + D_2' + L_2}{L_1 + L_2}$$

Figure 2:
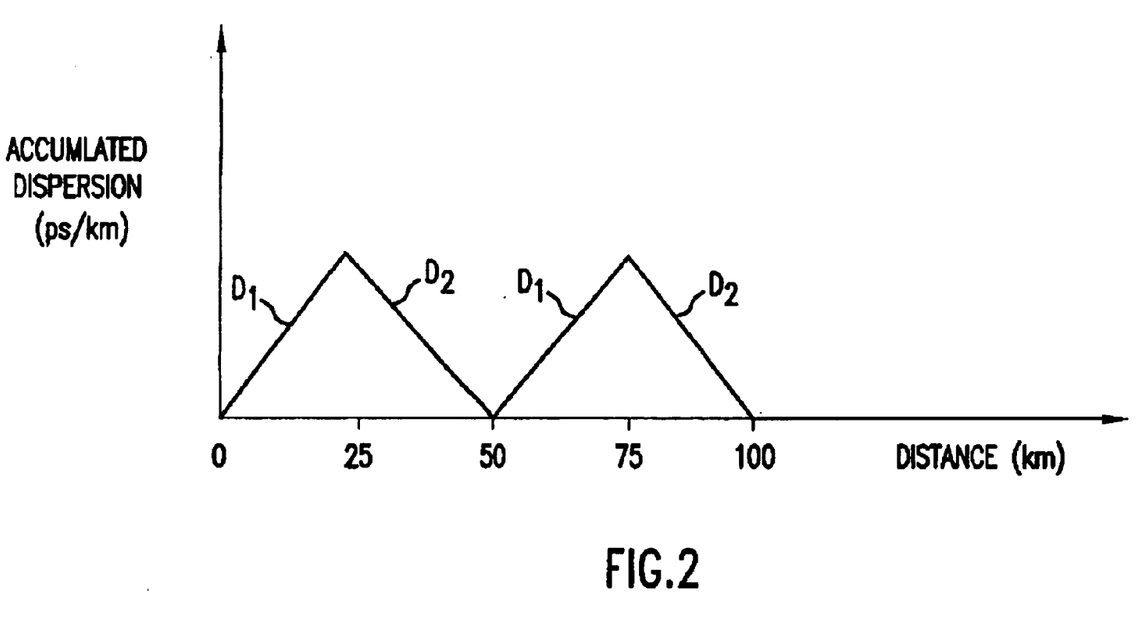
FIG. 2 illustrates accumulated dispersion as a function of transmission distance for the optical sublink shown in FIG. 1.

FIG. 2 illustrates accumulated dispersion as a function of transmission distance for the optical sublink shown in FIG. 1. For a given link span, the dispersion along one fiber segment accumulates to a particular point and then the dispersion along the next fiber segment reduces the accumulated dispersion back to about zero. Because the dispersion slopes of the two fiber segments have similar magnitudes but are opposite signed, the accumulated dispersions for all wavelengths are all reduced to about zero at the end of the link span.

Figure 3:
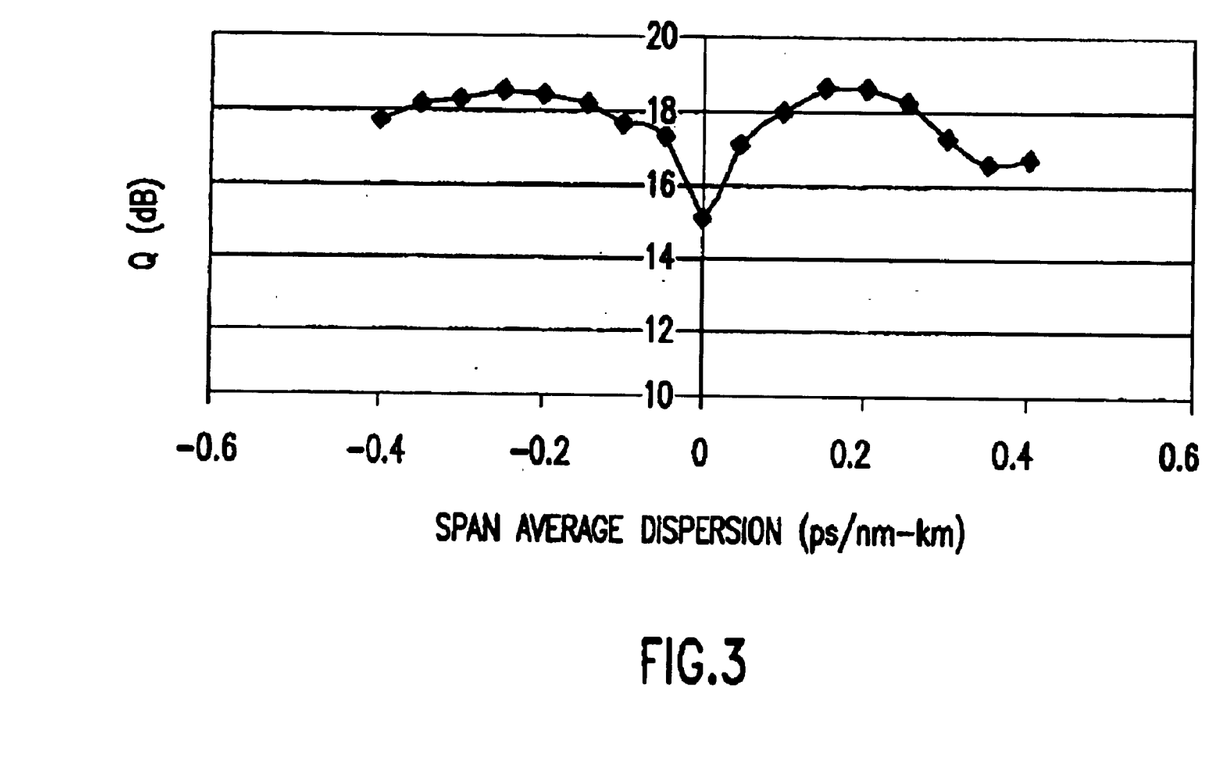
FIG. 3 illustrates the Q-factor (in dB) as a function of the link-span average dispersion (in ps/nm-km), for the optical link shown in FIG. 1.

It has been recognized, however, that such a configuration has a less than optimal performance. FIG. 3 illustrates the Q-factor (in dB) as a function of the link-span average dispersion (in ps/nm-km), for the optical link shown in FIG. 1. As FIG. 3 illustrates, when the magnitude of the link-span average dispersion is around zero, the Q-factor (and thus the system performance) is reduced. This is due to cross-phase modulation. As the magnitude of the link-span average dispersion is increased from zero, the Q-factor increases to a maximum before decreasing again due to intersymbol interference from too much dispersion accumulation.

Consequently, the inventors have recognized that dispersion maps using dispersion-slope-compensating optical fibers should be designed so that the magnitude of the average dispersion accumulated over a link span is substantially greater than zero while the overall optical sublink has an accumulated dispersion less than a dispersion tolerance limit. In other words, regardless of whether the average dispersion accumulated over a given link span has a negative value or a positive value, the absolute value of the average dispersion accumulated over a given link should be substantially greater than zero so that the cross-phase modulation is reduced to an acceptable level. Said another way, the dispersion map can be designed, for example, so that the magnitude of the accumulated dispersion at a particular link span is substantially greater than zero until the last link span corrects for the accumulated dispersion thereby reducing the accumulated dispersion at the end of the optical sublink to a desired value.

Moreover, the design of dispersion maps using dispersion-slope-compensating optical fibers are such that the dispersion slope for the overall optical sublinks is compensated while also compensating for the accumulated dispersion. This, however, presents a difficulty in that an optical sublink combining two optical fiber types yields a zero dispersion slope at a specific (generally non-zero) dispersion determined by the properties of the optical fibers. Therefore, the inventors have recognized that it is desirable to be able to specify independently the dispersion and the dispersion slope of a dispersion map so that, for example, the end of an optical sublink can have a desired dispersion (for example, a dispersion less than a dispersion tolerance) and a dispersion slope substantially equal to zero. The term "dispersion slope substantially equal to zero" can include a relatively small dispersion slope resulting in accumulated dispersions for multiple wavelengths with variance within an acceptable tolerance (e.g., a variance of 0.2 ps/km for a 30 nm range of wavelengths for an optical sublink having a 540 km length).

A dispersion map can be designed where the dispersion and the dispersion slope are independently selected through the combination of at least three types of optical fibers having complementary characteristics. By using a combination of these fiber types, two degrees of freedom can be obtained so that both the dispersion and the dispersion slope can be specified for a dispersion map. Note that this is one more degree of freedom than is the case where two optical fiber types have complementary characteristics (e.g., where one optical fiber type has a positive dispersion and a positive dispersion slope, and the other optical fiber type has a negative dispersion and a negative dispersion slope).

Figure 4:
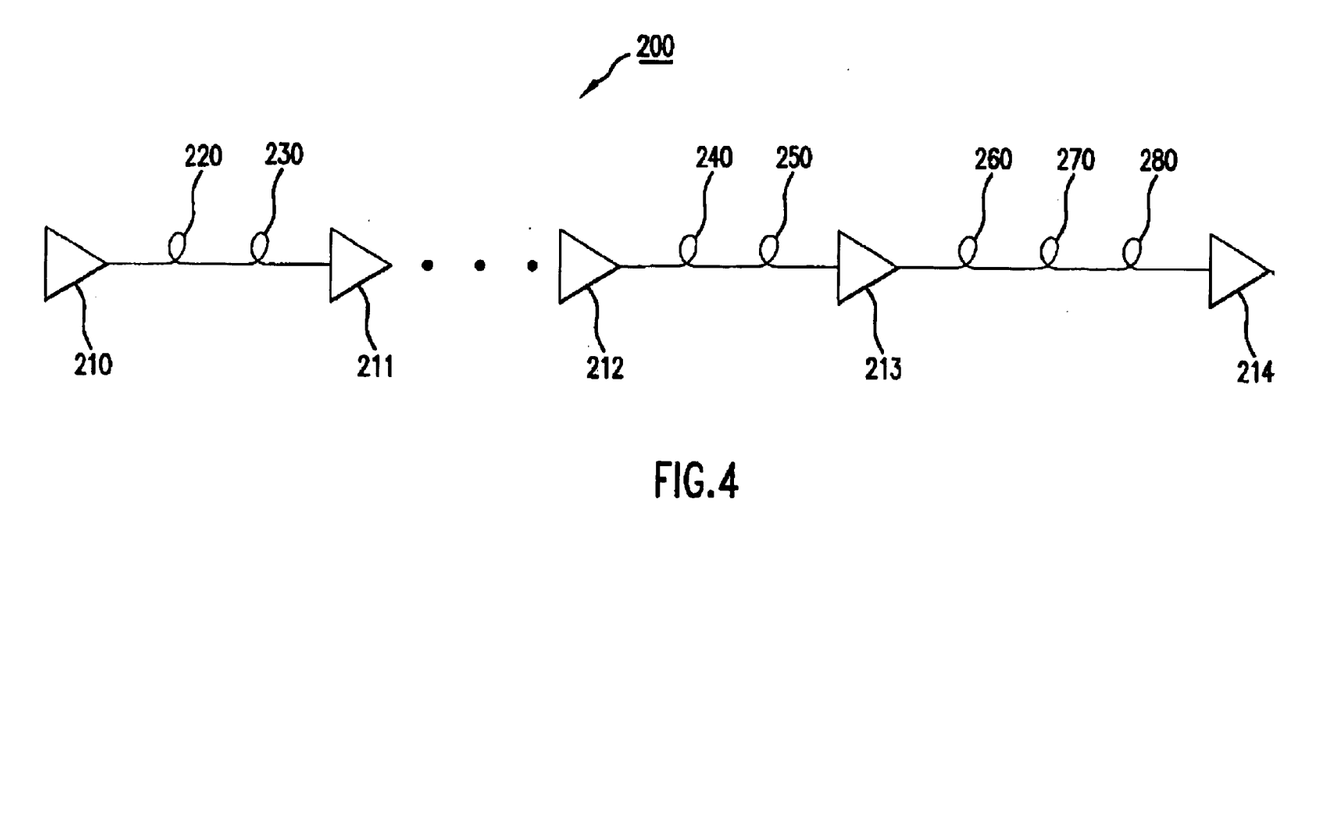
FIG. 4 illustrates an optical sublink, according to an embodiment of the present invention.

FIG. 4 illustrates an optical sublink, 200 that includes optical amplifiers 210, 211, 212, 213 and 214. Optical sublink 200 also includes fiber segments 220, 230, 240, 250, 260, 270 and 280. Optical sublink is configured such that the following components are connected in series: amplifier 210, fiber segment 220, fiber segment 230 and amplifier 211; amplifier 212, fiber segment 240, fiber segment 250, amplifier 213, fiber segment 260, fiber segment 270, fiber segment 280 and amplifier 214. Note that for optical sublink 200, amplifier 211 and amplifier 212 are coupled together through a series of link spans including fiber segments and amplifiers not shown in FIG. 4. For example, the optical sublink 200 can have ten fiber spans between amplifiers 210 and 213 and an eleventh fiber span between amplifiers 213 and 214.

Fiber segments 220, 240 and 260 can be a first type of optical fiber (such as, for example, SMF (single-mode fiber discussed above). Fiber segments 230, 250 and 280 can be a second type of optical fiber (such as, for example, 1x-IDF or 2x-IDF discussed above). Fiber segment 270 can be a third type of optical fiber (such as, for example, dispersion-shifted fiber which has a dispersion of −2 ps/nm-km, a dispersion slope of about 0.08 to 0.05 ps/nm/km/nm and an effective area of 55 $\mu m^2$; such a type of optical fiber is commercially available and manufactured by, for example, Lucent Technologies and Corning). Note that the particular order of fiber segment 260 (the first fiber type), fiber segment 270 (the third fiber type) and fiber segment 280 (the second fiber type) within their link span can differ for different configurations.

As just discussed above, the optical sublink 200 can have, for example, ten fiber spans between amplifiers 210 and 213 and an eleventh fiber span between amplifiers 213 and 214. In such an embodiment, the fiber spans between amplifiers 210 and 213 can each include a pair of fiber segments having the first fiber type (e.g., SMF) and the second fiber type (e.g., IDF). In this embodiment, the length of fiber segments within the link spans between amplifier 210 and 213 can be, for example, 25 km. Said another way, the fiber segments 220, 230 through 240 and 250 can each have a length of, for example, 25 km. The length of fiber segments 260, 270 and 280 can be, for example, 12.5 km, 1 km and 25 km, respectively.

Generally speaking, the first optical fiber type can have, for example, a positive dispersion and a positive dispersion slope. The second optical fiber type can have, for example, a negative dispersion and a negative dispersion slope. The third optical fiber type can have, for example, either (1) a positive dispersion and a negative dispersion slope, and (2) a negative dispersion and a positive dispersion slope. By using a combination of three optical fiber types with complementary characteristics, two degrees of freedom can be obtained so that both the dispersion and the dispersion slope can be specified for a dispersion map.

Figure 5:
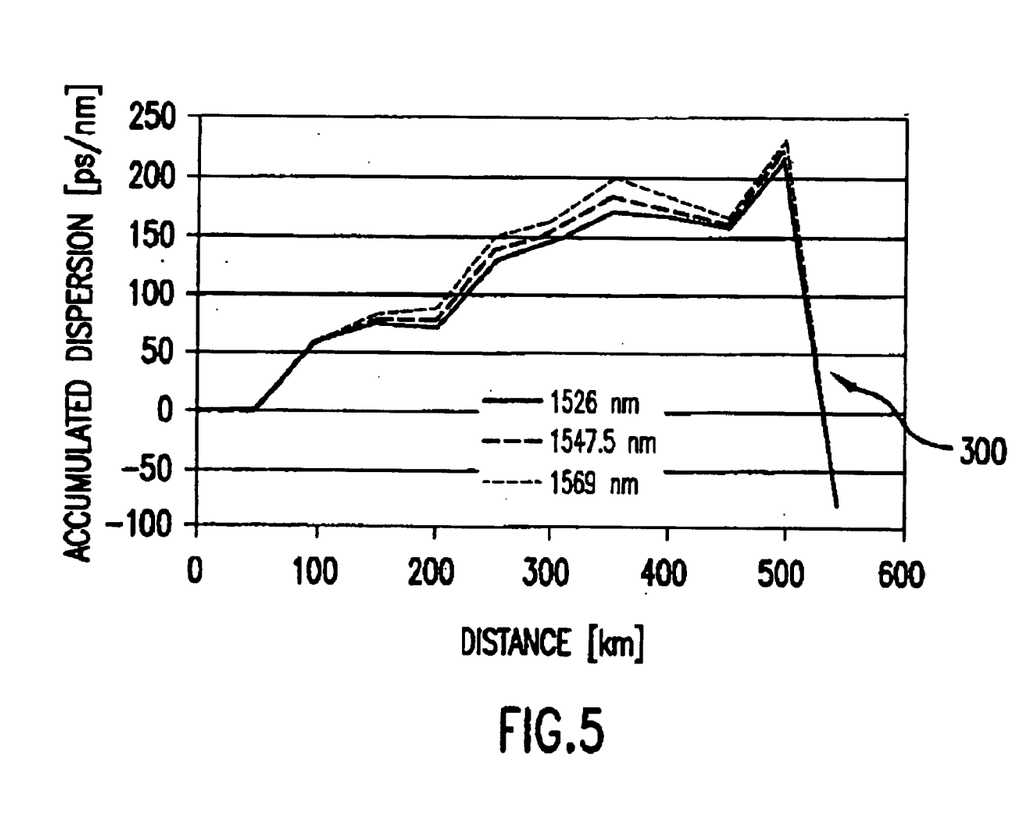
FIG. 5 illustrates a graph of the accumulated dispersion (in ps/nm) as a function of distance (in km) for three wavelengths for the optical sublink shown in FIG. 4.

FIG. 5 illustrates a graph of the accumulated dispersion (in ps/nm) as a function of distance (in km) for three exemplary wavelengths 1526 nm, 1547.5 nm and 1569 nm. for the optical sublink shown in FIG. 4. As FIG. 5 shows, the dispersion map for the optical sublink shown in FIG. 4 can such that the dispersion for each fiber span can have an increasing accumulated dispersion until the last fiber span 300 (i.e., the portion of optical sublink 200 that includes amplifier 213, fiber segment 260, fiber segment 270, fiber segment 280 and amplifier 214) corrects for the dispersion and the dispersion slope.

In other words, as FIG. 5 illustrates, the accumulated dispersion for each wavelength differs for the various fiber spans of the optical sublink 200 until the end of the last fiber span 300 where the dispersion slope is compensated so that the accumulated dispersion is the same for the various wavelengths. In this embodiment, the accumulated dispersion at the end of the optical sublink 200 has a value of approximately −80 ps/nm. By controlling the length of fiber segment 270, the dispersion slope can be compensated and, simultaneously, the accumulated dispersion at the end of the optical sublink 200 can be specified.

Figure 6:
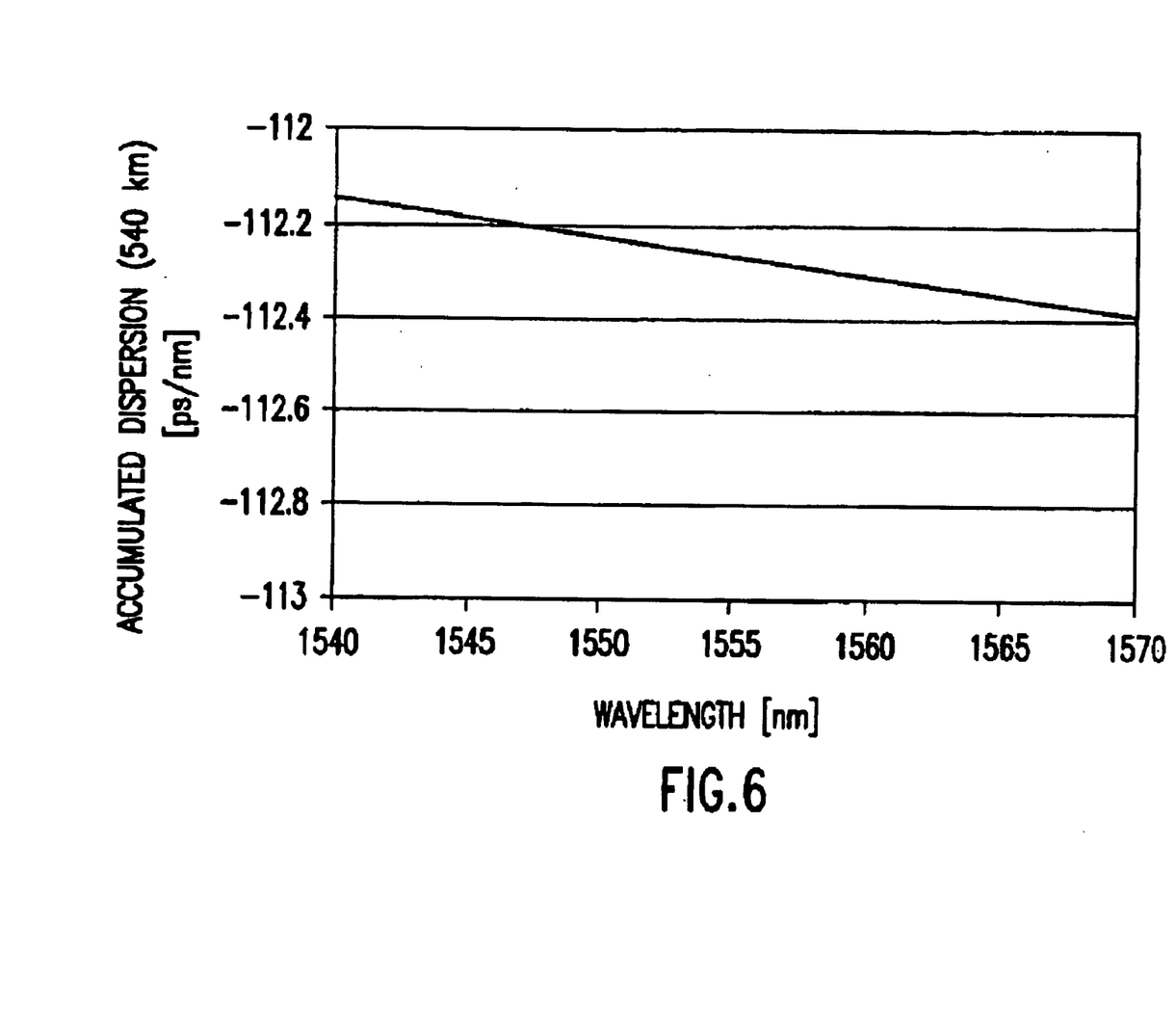
FIG. 6 illustrates a graph of the accumulated dispersion (in ps/nm) as a function of wavelength (in nm) for the optical sublink shown in FIG. 4.

FIG. 6 illustrates a graph of the accumulated dispersion (in ps/nm) as a function of wavelength (in nm) for the optical sublink shown in FIG. 4. The accumulated dispersion for the shown range of wavelengths between 1540 nm and 1570 nm has accumulated dispersion that varies only between about −112.2 ps/nm and −112.4 ps/nm. Thus, the accumulated dispersion over a wavelength range of 30 nm varies only about 0.2 ps/nm for a 540 km. The dispersion slope for the optical sublink is approximately less than $10^{-5}$ ps/nm/km/nm (within the measurement accuracy).

As FIG. 6 illustrates, a desirable dispersion slope can be achieved so that the accumulated dispersion for various wavelengths is about the same (e.g., varying only 0.2 ps/nm over a 540 km optical sublink). Said another way, by selecting the dispersion slope for a specified dispersion at a particular location within the optical sublink (e.g., at the end of the optical sublink), the dispersion slope can be selected. As shown in the example of FIG. 6, the dispersion slope can be selected to be substantially zero thereby achieving an accumulated dispersion varying, for example, only 0.2 p/nm over a 540 km optical sublink.

It should, of course, be understood what while the present invention has been described in reference to particular configurations, other configurations should be apparent to those of ordinary skill in the art. For example, although the optical fiber types discussed as examples above related to particular commercial slope-compensating optical fiber, other types of slope-compensating optical fibers are possible.

In addition, although the dispersion map discussed herein as an example had an increasing accumulated dispersion until the last link span within the optical sublink, other types of dispersion maps are possible. For example, in another embodiment, the dispersion map can have a decreasing accumulated dispersion until the last link span within the optical sublink at which point the last link span can be selected so that the accumulated dispersion returns towards zero and the dispersion slope is compensated (thereby resulting in multiple wavelengths having substantially equal accumulated dispersion).

What is claimed is:

1. An apparatus, comprising:
   an optical sublink including an operationally coupled plurality of optical fiber segments, the plurality of optical fiber segments being from a first optical fiber type, a second optical fiber type and a third optical fiber type,
   the first optical fiber type having a dispersion and a dispersion slope,
   the second optical fiber type having a dispersion and a dispersion slope substantially equal in magnitude to and opposite signed from the dispersion and the dispersion slope of the first optical fiber type,
   the third optical fiber type having a dispersion opposite signed from the dispersion of the first optical fiber type and having a dispersion slope opposite signed from the dispersion slope of the second optical fiber type,
   wherein the plurality of optical fiber segments define a plurality of link spans including a first link span,
   the first link span having a first optical fiber segment and a second optical fiber segment from the plurality of optical fiber segments, the first optical fiber segment of the first link span being the first optical fiber type the second optical fiber segment of the first link span being the second optical fiber type.

2. The apparatus of claim 1, wherein
   the plurality of link spans includes a second link span and a third link span,
   the second link span having a first optical fiber segment and a second optical fiber segment from the plurality of optical fiber segments, the first optical fiber segment of the second link span being the first fiber type, the second optical fiber segment of the second link span being the second fiber type,
   the third link span having a first optical fiber segment, a second optical fiber segment and a third fiber segment, the first optical fiber segment of the third link span being the first fiber type, the second optical fiber segment of the third link span being the second fiber type, the third fiber segment of the third link span being the third fiber type.

3. The apparatus of claim 1, wherein:

the plurality of link spans includes a second link span and a third link span, the optical sublink further includes a first optical repeater, a second optical repeater, a third optical repeater and a fourth optical repeater, the first link span is between the first optical repeater and the second optical repeater, the second link span is been the second optical repeater and the third optical repeater, the third link span is between the third repeater and the fourth optical repeater.

4. The apparatus of claim 1, wherein:

the optical sublink has an end-to-end dispersion for each wavelength from a plurality of wavelengths, the end-to-end dispersion for each wavelength from the plurality of wavelengths being substantially equal.

5. The apparatus of claim 1, wherein:

the plurality of lin spans includes a second link span and a third link span, the first link span having a local average dispersion for each wavelength from the plurality of wavelengths with a magnitude substantially greater than zero, the second link span having a local average dispersion for each wavelength from the plurality of wavelengths with a magnitude substantially greater than zero, the magnitude of the end-to-end dispersion for each wavelength from the plurality of wavelengths being less than an end-to-end tolerance dispersion, the third link span defining an end of the optical sublink.

6. The apparatus of claim 1, wherein:

the plurality of link spans includes a second link span and a third link span, the second link span including optical fiber segments from the plurality of optical fiber segments having the first optical fiber type and the second optical fiber type, and the third link span including optical fiber segments from the plurality of optical fiber segments having the first optical fiber type, the second optical fiber type and the third optical fiber type.

* * * * *

UNITED STATES PATENT AND TRADEMARK OFFICE
CERTIFICATE OF CORRECTION

PATENT NO. : 6,873,798 B1
DATED : March 29, 2005
INVENTOR(S) : Alexei Pilipetskii, Matthew Ma and Morten Nissov It is certified that error appears in the above-identified patent and that said Letters Patent is hereby corrected as shown below:

Title page,
Item [57], ABSTRACT,
Line 1, delete the word "an", second occurrence.

Column 1,
Line 31, delete "∀";
Line 60, delete the word "an", second occurrence.

Column 2,
Line 25, delete the word "a";
Lines 54 and 55, delete the word "sign" and insert the words -- signs of --;
Line 60, delete the word "sign" and insert the words -- signs of --, both occurrences;
Line 66, delete the word "fiber" and insert the word -- sublink --; and delete the number "10" and insert the number -- 110 --.

Column 5,
Line 38, after the word "can" insert the word -- be --.

Signed and Sealed this

Sixth Day of September, 2005

JON W. DUDAS
*Director of the United States Patent and Trademark Office*